United States Patent Office 2,869,687
Patented Jan. 20, 1959

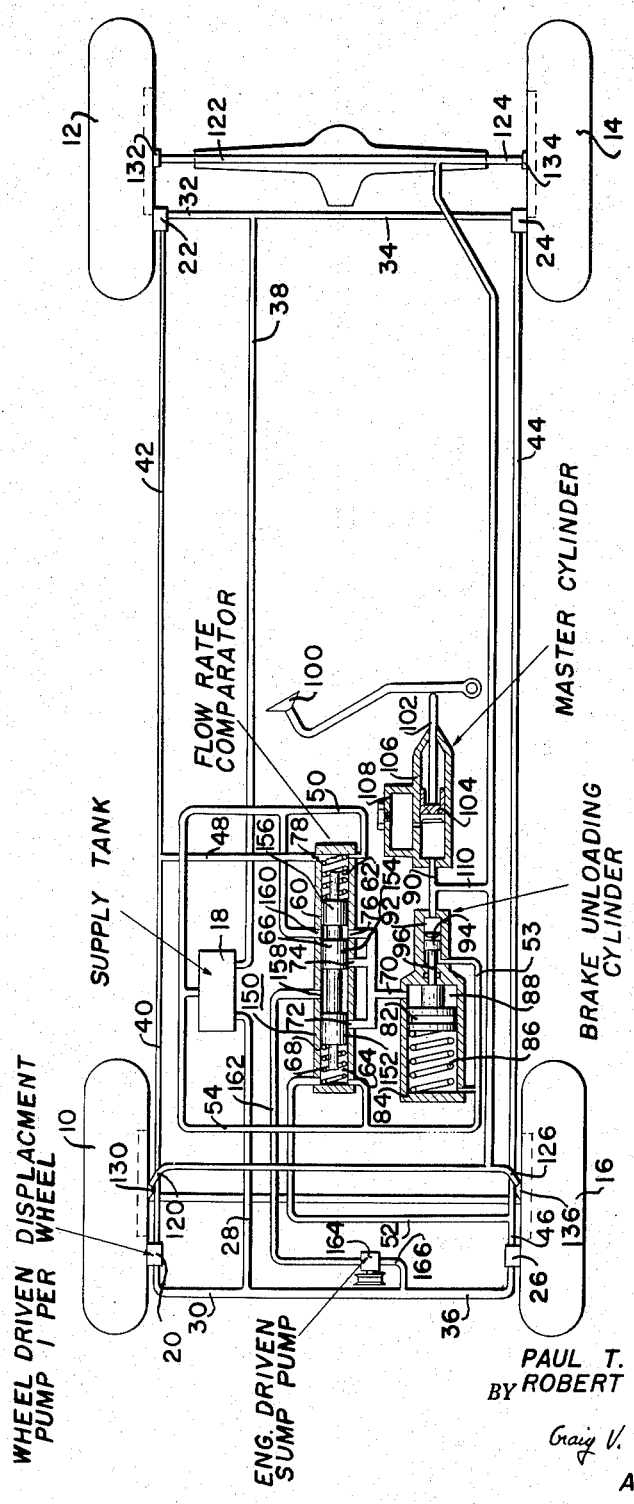

2,869,687

ANTI-SKID HYDRAULIC BRAKE SYSTEM

Paul T. Keim, Vandalia, and Robert C. Treseder, Dayton, Ohio, assignors to General Motors Corporation, Detroit, Mich., a corporation of Delaware Application May 7, 1954, Serial No. 428,224

5 Claims. (Cl. 188—181)

This invention pertains to hydraulic brake systems, and particularly to means for preventing the locking of any one wheel on a motor vehicle equipped with hydraulically operated brakes.

The hazards of driving a motor vehicle on slippery road surfaces are well recognized. Numerous vehicle accidents can be attributed to the skidding of motor vehicles on slippery roads due to the locking of a vehicle wheel when the brakes are applied. This invention relates to simple and economical means for preventing the locking of any one wheel of a motor vehicle equipped with hydraulically operated brakes. Accordingly, among our objects are the provisions of means for preventing the locking of any one wheel of a motor vehicle having hydraulically actuated brakes due to braking of the vehicle; the further provision of means for automatically rendering the hydraulic braking system of a vehicle inoperative if any one wheel should become locked during braking, so as to free all wheels for rotation; and the still further provision of means for automatically rendering the hydraulic braking system operative after the locked wheel, or wheels, have been released.

The aforementioned and other objects are accomplished in the present invention by incorporating a fluid pressure system responsive to the operative condition of the vehicle wheels for controlling the operability of the hydraulic braking system of the motor vehicle. Specifically, the mechanism of this invention includes a fixed displacement pump driven by each wheel. The pumps for the wheels on each side of the vehicle are connected in parallel, and the flows produced by the pumps on each side of the vehicle are thereafter combined. The combined output flows of the pumps on one vehicle side traverses an actuating chamber for one side of a servo actuated, reciprocable valve, or flow rate comparator, and the combined output flows of the pumps on the other vehicle side traverses an actuating chamber for the other surface of the comparator valve. The system also includes a fixed displacement, engine driven pump which supplies pressure fluid to a supply port of the comparator valve.

The flow comparator is a two-way valve having a pair of control ports connected by a conduit to a brake unloading actuator. The flow comparator is arranged to be maintained in the neutral position at all times except when any one vehicle wheel is locked, at which time, the unequal flows produced by the wheel driven pumps will actuate the comparator valve. It should be noted that in the embodiment disclosed, locking of any one vehicle wheel, both wheels on the same side of the vehicle, and locking of three wheels will cause operation of the comparator valve, but the simultaneous locking of two vehicle wheels on opposite sides of the vehicle and the simultaneous locking of all vehicle wheels of a four-wheel vehicle will not effect operation of the comparator valve.

The brake unloading actuator includes a cylinder having disposed therein a spring biased piston capable of fluid pressure actuation in one direction. The actuator piston has a rod operatively connected with a brake unloading piston disposed in a brake unloading cylinder. Accordingly, when the comparator valve is actuated so as to direct flow from the engine driven pump to the actuator cylinder, the brake unloading piston will be displaced so as to increase the volume of the brake unloading cylinder. As the brake unloading cylinder is connected by a conduit to the master cylinder of the hydraulic braking system, the hydraulic brake lines, or conduits leading to the brake cylinders, associated with each wheel will have the pressure therein relieved so as to free all wheels for rotation. Thus, when the volume of the unloading cylinder is increased while the brakes are being applied, the pressure created in the hydraulic brake lines by the master cylinder will be relieved so as to free the locked vehicle wheel, or wheels, for rotation. However, as soon as all wheels are again free for rotation, the comparator valve will be actuated so as to interrupt the application of pressure fluid to the actuator whereby the spring will reposition the actuator piston. In this manner, the unloading piston will restore pressure in the hydraulic brake lines so as to render the hydraulic braking system operative.

Further objects and advantages of the present invention will be apparent from the following description, reference being had to the accompanying drawing wherein a preferred embodiment of the present invention is clearly shown.

The drawing represents a schematic diagram of the anti-skid brake system of the present invention.

With particular reference to the drawing, a four-wheel motor vehicle is disclosed, the wheels being indicated by numerals 10, 12, 14 and 16. Each wheel is operatively connected to and drives a fixed displacement pump, the pumps being indicated by numerals 20, 22, 24 and 26. The intake sides of pumps 20 and 26 are connected by conduits 30 and 36 to a conduit 28 which connects with a sump or supply tank 18, while the inlets of pumps 22 and 24 are connected with conduits 32 and 34 with a conduit 38, which, likewise, connects with the sump 18. The outlet sides of pumps 20, 22, 24 and 26 are connected to conduits 40, 42, 44 and 46, respectively. Thus, it may be seen that the pumps 20 and 22 on one side of the motor vehicle are connected in parallel, while the pumps 24 and 26 on the other side of the vehicle are, likewise, connected in parallel. The output of pumps 20 and 22, which flows through conduits 40 and 42, respectively, is combined and flows through a conduit 48, and this combined flow traverses an actuating chamber 62 and, thence, flows through conduit 50 to the sump 18. The conduit 50 is connected to the chamber 62 through a restricted orifice so as to maintain a pressure head in chamber 62 during operation of pumps 20 and 22. Similarly, the flows from pumps 24 and 26 are combined and flow through conduit 52, the combined flows traversing an actuating chamber 64 and, thence, flowing through conduit 54 to the sump 18. The conduit 54 is connected to the chamber 64 through a restricted orifice so as to maintain a pressure head in the chamber 64 during operation of pumps 24 and 26.

The vehicle is shown equipped with an hydraulically actuated brake system including a pivotally mounted, manually operable brake pedal 100, which is operatively connected to the rod 102 of a piston 104 disposed in a master cylinder 106. The master cylinder has communication with a reservoir 108 containing brake fluid and also has communication with a conduit 110, which connects with brake lines 120, 122, 124 and 126, that connect with the wheel carried brake cylinders 130, 132, 134 and 136, respectively. The hydraulic braking system, per se, is conventional in that upon operation of the pedal 100, the brake lines are pressurized as are the wheel cylinders so as to actuate individual wheel brakes, which operate to restrain rotation of the wheels.

The master cylinder 106 is also connected by a conduit 90 to a brake unloading cylinder 92, which has disposed therein a brake unloading piston 94. The brake unloading piston 94 is connected by a rod 96 to an actuator piston 82 disposed in an actuator cylinder 84. The actuator piston 82 is capable of fluid pressure by actuation to the left, as viewed in the drawing, and is normally urged to the position shown by means of a compression spring 86. The rod end chamber of cylinder 92, as well as the head end chamber of cylinder 84 are connected to drain conduit 53. The rod end chamber 88 of the cylinder 84 is connected by a conduit 70 to ports 72, 74 and 76 of a flow comparator which is designated generally by the numeral 150.

The flow comparator includes a valve casing 60 having disposed therein a reciprocable plunger 66, which is normally centered in the neutral position by oppositely acting springs 68 and 78. The plunger 66 is formed with axially spaced lands 152, 154 and 156. In the neutral position of plunger 66, as shown in the drawing, the lands 152 and 154 close ports 72 and 74.

The valve casing 60 also includes a supply port 158 and a drain port 160, the drain port 160 being connected to conduit 50. The supply port 158 is connected to a conduit 162 to the output side of a fixed displacement engine driven pump 164, the inlet side of which is connected by a conduit 166 to the conduits 36 and 28 and, thence, to the sump 18.

During operation of the motor vehicle, the engine driven fixed displacement pump 164 will draw fluid from sump 18, increase the pressure thereof and discharge the same through conduit 162. Similarly, during movement of the vehicle, each of the fixed displacement wheel driven pumps 20, 22, 24 and 26 will draw fluid from the sump 18, increase the pressure thereof, and discharge the same into conduits 40, 42, 44 and 46, respectively. The combined flows from pumps 20 and 22 will flow through conduit 48 and traverse actuating chamber 62, while the combined flows from pumps 24 and 26 will flow through conduit 52 and traverse actuating chamber 64. Inasmuch as the wheel driven pumps are identical, the flows under pressure traversing the oppositely acting actuating chambers 62 and 64 will, likewise, be equal and the valve plunger 66 will remain in the neutral position. Similarly, when the operator applies the brakes by actuating pedal 100, and all of the wheels are thereby gradually restrained against rotation, the flows under pressure traversing the oppositely acting, actuating chambers 62 and 64 will be equal and the valve plunger 66 will remain in the neutral position. However, if upon application of the brakes, wheel 10 should become locked while wheels 12, 14 and 16 are gradually decelerated by their respective brakes, actuating chamber 64 will have a greater flow under pressure therethrough than will actuating chamber 62, and in this manner, the plunger 66 will be servo actuated and moved to the right, as viewed in the drawing. When the plunger 66 moves to the right, the supply port 158 will connect with port 74, land 154 at this time blocking communication between drain ports 76 and 160, so that fluid under pressure from the conduit 162 will be applied through conduit 70 to the chamber 88 of the actuator. In this manner, the actuator piston 82 will be moved to the left and concurrently therewith the brake unloading piston 94 will be moved to the left, as viewed in the drawing. In this manner, the pressure created by the master piston in the brake lines will be relieved so as to free all wheels on the vehicle for rotation. Thus, the tendency of the vehicle to skid will be prevented. It should be noted that the anti-skidding system will render the braking system inoperative when any one vehicle wheel becomes locked, or an odd number of wheels become locked. In addition, the anti-skid system will render the hydraulically actuated braking system inoperative when two wheels on the same side of the vehicle become locked. However, it is apparent that the anti-skid system will not render the hydraulically actuated brake system inoperative when two wheels on opposite sides of the vehicle become locked or when all of the vehicle wheels become locked.

After operation of the flow comparator valve 150 so as to render the hydraulically actuating braking system inoperative, thereby freeing all wheels for rotation, the hydraulic operating braking system will again be rendered operative inasmuch as all of the wheel driven fixed displacement pumps will again be operative. Thus, equal flows will traverse the oppositely acting, actuating chambers 62 and 64, thereby permitting the centering springs 68 and 78 to reposition the plunger 66 in the neutral position, as shown in the drawing, thus connecting the actuator cylinder to drain through ports 76, 160 and conduit 50.

While the embodiment of the present invention as herein disclosed, constitutes a preferred form, it is to be understood that other forms might be adopted.

What is claimed is as follows:

1. Brake mechanism for a motor vehicle having a plurality of wheels, including in combination, a fluid pressure operated brake for each wheel, a braking system for applying fluid under pressure concurrently to each wheel brake, a fluid pressure system including a fixed displacement pump driven by each wheel, means connecting the pumps on each side of said vehicle in parallel, means for relieving the pressure in said braking system for rendering said braking system inoperative, and means operatively connected to said pressure relieving means and responsive to the absence of flow from any one of said fixed displacement pumps as caused by locking of any one vehicle wheel during braking for positively actuating said pressure relieving means so as to render said braking system inoperative.

2. Brake mechanism for a motor vehicle having a plurality of wheels, including in combination, a fluid pressure operated brake for each wheel, a braking system for applying fluid under pressure concurrently to each wheel brake, means for relieving the pressure in said braking system so as to render said system inoperative, said pressure relieving means including a brake unloading cylinder having disposed therein a brake unloading piston, a source of fluid pressure for actuating said brake unloading piston, and means controlling the application of pressure fluid from said source so as to positively operate said brake unloading piston including a fixed displacement pump operatively connected to and driven by each wheel, means connecting the output of the pumps on each side of the vehicle in parallel and means for comparing the flows produced by the pumps on each side of the vehicle and responsive to unequal flows produced thereby for actuating said pressure relieving means whereby the locking of any one vehicle wheel will result in operation of said brake unloading piston to render the braking system inoperative.

3. The combination set forth in claim 2 wherein the means responsive to unequal flows produced by said wheel driven displacement pumps comprises a normally spring centered flow comparator valve having oppositely acting, actuating chambers which are subjected to the combined flows produced by the pumps on opposite sides of said vehicle.

4. Brake mechanism for a vehicle having a plurality of wheels, including in combination, a fluid pressure operated brake for each wheel, a braking system for applying fluid under pressure concurrently to each wheel brake, a pump driven by each wheel, means connecting the outlet side of the pumps on each side of the vehicle in parallel, means for comparing the output flows produced by the pumps on each side of the vehicle, fluid pressure actuated brake unloading means for relieving the pressure in said braking system to render said braking system inoperative, a source of fluid pressure for actuating said brake unloading means and a valve interconnecting said source of fluid pressure and said brake unloading means and actuated by said flow comparing means for displacing said valve in response to unequal output flows produced by said pumps.

5. The combination set forth in claim 4 wherein said flow comparing means comprises a normally spring centered servo mechanism having opposed chambers subjected to the combined output flows of the pumps on opposite sides of said vehicle, and wherein said brake unloading means comprises a cylinder having disposed therein a piston, said piston being spring biased in one direction and capable of fluid pressure actuation in the other direction.

References Cited in the file of this patent

UNITED STATES PATENTS

| | | |
|---|---|---|
| 1,582,955 | Wildin et al. | May 4, 1926 |
| 1,842,488 | Whitaker | Jan. 26, 1932 |
| 2,107,823 | Hallot | Feb. 8, 1938 |
| 2,132,916 | Aikman | Oct. 11, 1938 |
| 2,330,739 | Piron | Sept. 28, 1943 |
| 2,423,057 | Thomas et al. | June 24, 1947 |
| 2,753,017 | Curl et al. | July 3, 1956 |
| 2,759,571 | Carlson et al. | Aug. 21, 1956 |

FOREIGN PATENTS

| | | |
|---|---|---|
| 874,639 | France | May 18, 1942 |
| 290,713 | Great Britain | May 15, 1928 |